(12) United States Patent
Uhlemann et al.

(10) Patent No.: US 6,592,077 B2
(45) Date of Patent: Jul. 15, 2003

(54) WINDOWS WITH A LENS FOR AN AIRCRAFT DOOR

(75) Inventors: Sven Uhlemann, Uetersen; Michael Race, Buchholz, both of (DE)

(73) Assignee: Airbus Deutschland GmbH, Hamburg (DE)

( * ) Notice: Subject to any disclaimer, the term of this patent is extended or adjusted under 35 U.S.C. 154(b) by 73 days.

(21) Appl. No.: 09/960,465

(22) Filed: Sep. 19, 2001

(65) Prior Publication Data

US 2002/0033433 A1 Mar. 21, 2002

(51) Int. Cl.[7] .................................................. B64C 1/14
(52) U.S. Cl. ...................................................... 244/129.3
(58) Field of Search ........................... 244/129.3, 129.5; 359/742

(56) References Cited

U.S. PATENT DOCUMENTS

| | | | |
|---|---|---|---|
| 1,390,258 A | * 9/1921 | Geneste | 244/1 R |
| 4,358,182 A | * 11/1982 | Hayes et al. | 244/129.3 X |
| 4,504,341 A | * 3/1985 | Radzwill et al. | 244/129.3 X |
| 4,709,657 A | * 12/1987 | Gothard | 119/253 |
| 6,108,141 A | * 8/2000 | Gadberry | 359/742 |
| 6,168,112 B1 | 1/2001 | Mueller et al. | |

FOREIGN PATENT DOCUMENTS

| | | | |
|---|---|---|---|
| DE | 19806107 | 8/1999 | |
| DE | 19806108 | 8/1999 | |
| DE | 19806106 | 9/1999 | |
| GB | 2042204 A | * 9/1980 | G02B/17/00 |

* cited by examiner

*Primary Examiner*—Robert P. Swiatek
(74) *Attorney, Agent, or Firm*—W. F. Fasse; W. G. Fasse

(57) ABSTRACT

A window for an aircraft door includes an outer pane, an inner pane, and a Fresnel lens element provided in the interspace formed between the inner and outer panes. The Fresnel lens element may be a self-supporting lens element pane positioned intermediately within the interspace between the inner and outer panes, or a lens film adhesively bonded onto the surface of the inner pane facing the interspace, or a Fresnel lens configuration provided directly on the surface of the inner pane facing the interspace. The Fresnel lens element provides an expanded field of view, especially in a downward direction, when looking out through the window, to comply with safety regulations that require visual inspection of the area outside of the aircraft door and especially below the door, before opening the door.

21 Claims, 2 Drawing Sheets

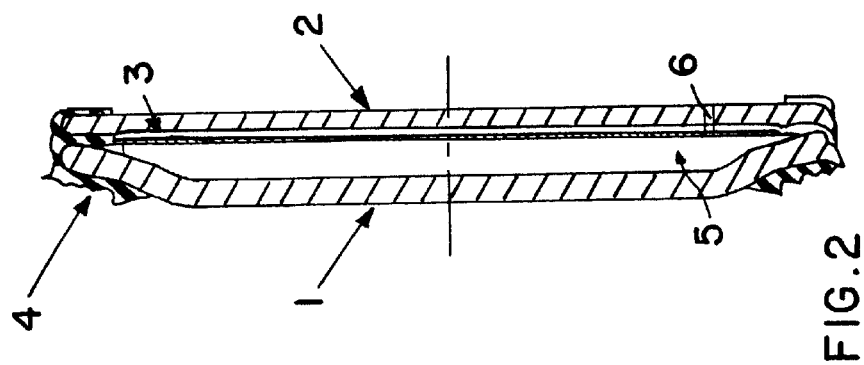
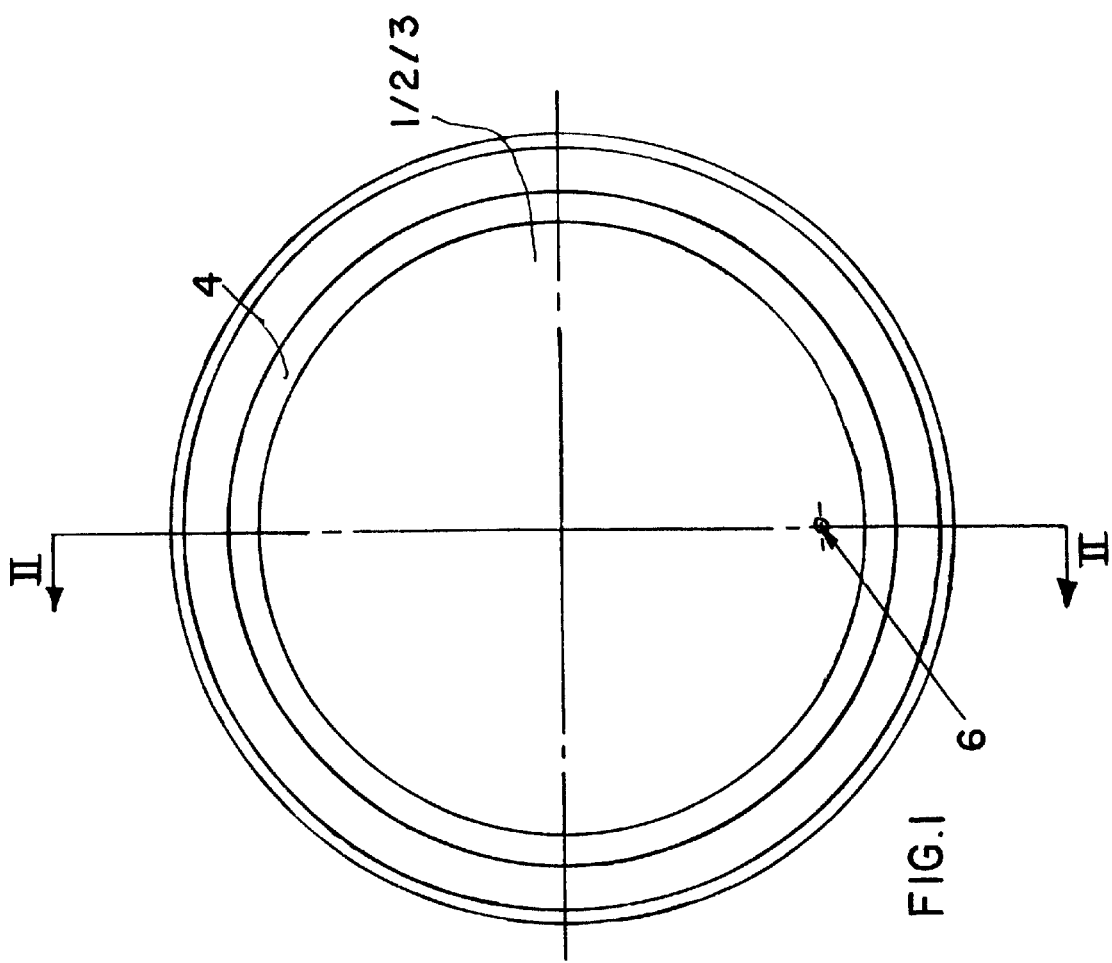

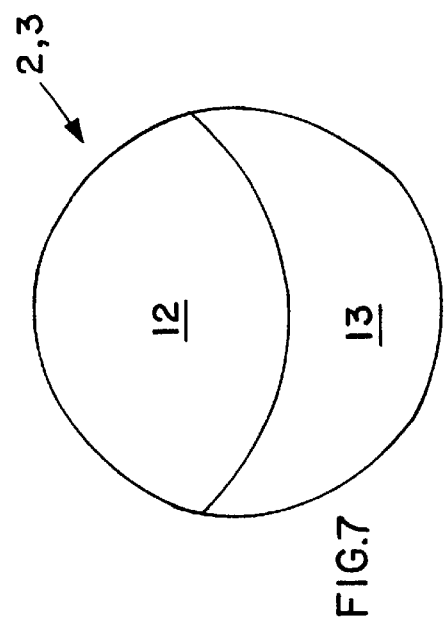
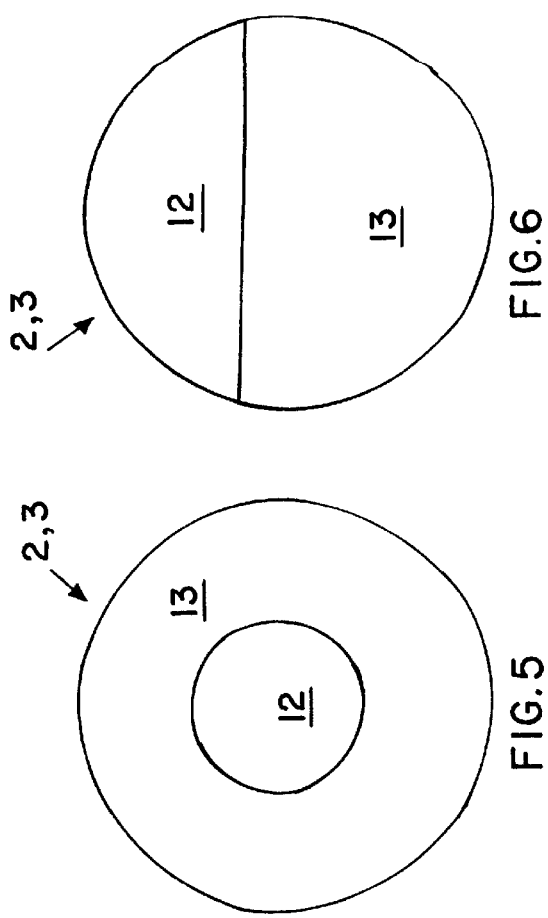
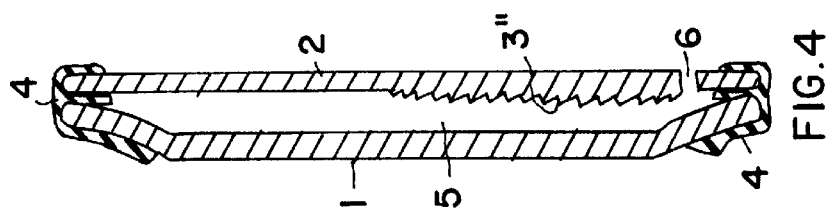
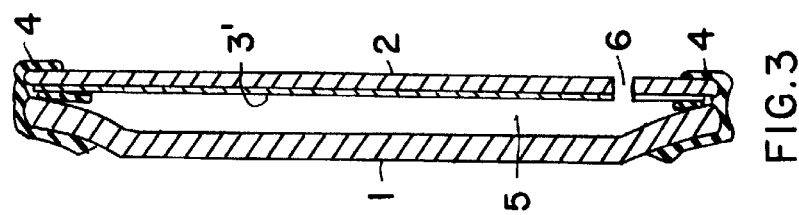

WINDOWS WITH A LENS FOR AN AIRCRAFT DOOR

PRIORITY CLAIM

This application is based on and claims the priority under 35 U.S.C. §119 of German Patent Application 100 46 568.4, filed on Sep. 19, 2000, the entire disclosure of which is incorporated herein by reference.

FIELD OF THE INVENTION

The invention relates to a multi-pane window for an aircraft door, with an improved field of view from the inside to the outside of the aircraft, and especially in an area below the window, e.g. toward the bottom of the door.

BACKGROUND INFORMATION

The generally known construction of cabin windows in pressurized passenger aircraft is a double pane construction that provides fail-safe properties. A hollow interspace is enclosed between the outer and inner panes of the cabin window, and a ventilation or pressure compensation hole is typically provided near the bottom of the inner window pane in order to achieve a pressure compensation between the cabin interior and the hollow interspace between the window panes during flight, and especially during the climb and descent phases of a flight, which are typically associated with cabin pressure changes. It is also typically known that the perimeter or peripheral edges of the two panes are held and sealed in an airtight manner in a window seal, and are secured in a window frame which is in turn fitted into and mechanically connected to a corresponding opening in the aircraft fuselage.

Such a window construction for a passenger aircraft is, for example, disclosed in German Patent Publications DE 198 06 106 C1, DE 198 06 107 A1, and DE 198 06 108 A1. However, while this window construction is disclosed for a passenger cabin, it is not expressly mentioned for use in an aircraft door. For various reasons, different considerations apply to a window to be used in an aircraft door.

In the most modern passenger aircraft, in which the cabin floor is arranged rather high with respect to the cross-sectional contour of the fuselage, the windows are typically arranged at a location with a negative contour curvature of the fuselage. This is true also, or especially, for a window that is installed in an aircraft door of the aircraft, and results in a corresponding upward facing tilt of the window in the door. Such a result of the strong negative contour curvature of the door at the location of the window can be recognized, for example, in the known Airbus aircraft of the A319, A320, and A321 single aisle program series.

In order to ensure the safety of passengers who are to board or deplane through the aircraft door, both in the normal course of a flight and in an emergency evacuation situation, corresponding safety regulations require that the area outside of the door must be within view and visually inspected before the door is opened. For example, this means that a boarding stairway, boarding ramp or covered jetway that has been moved to the outside of the fuselage (in the usual situation), or an emergency evacuation slide that has been deployed (in an emergency situation), must be visible to the aircraft crew through the window of the door before the door is opened.

Due to the above described upward facing tilt of the windows, the field of view out through the window is limited, especially in a downward direction toward the area at the bottom of and below the door, where a stairway, evacuation slide, or the like would be arranged. For this reason, aircraft manufacturers have tried to improve the field of view through the lower portion of the window area, for example by arranging a thick heavy prism in this lower window area. Alternative attempts to improve the field of view in the lower window area have involved complicated mirror mechanisms or full solid lenses arranged to improve the view through the bottom area of the door window. Such prior art solutions have not been satisfactory, because they are costly, complicated, and do not provide a satisfactory improvement of the overall field of view.

SUMMARY OF THE INVENTION

In view of the above, it is an object of the invention to provide a window arrangement for an aircraft door, that provides an adequate field of view and adequate visibility of the surrounding area outside of the aircraft door, and especially to the area or fuselage section below the window, without interference or disagreeable distortion or limitation of the view, and in a simple economical manner. The invention further aims to avoid or overcome the disadvantages of the prior art, and to achieve additional advantages, as apparent from the present specification.

The above objects have been achieved according to the invention in a window arrangement for an aircraft door, comprising an outer pane and an inner pane that are sealed in an airtight manner by a window seal around the perimeter of the panes, and that are supported by a window frame in which the seal is received around the perimeter of the panes. An interspace is formed and enclosed between the two panes. Especially according to one embodiment of the invention, an intermediate pane embodied as an optical lens member is arranged within the interspace between the outer and inner panes, and is positioned and extends parallel to the surfaces of the outer and inner panes. The intermediate pane is embodied as an optical lens element over the majority, or especially substantially all of its surface, or particularly the entirety of its surface. For example, the intermediate pane is preferably embodied as a Fresnel lens over most or all of its surface. The Fresnel lens can be especially configured in such a manner to provide an increased field of view of the area below the window extending to the bottom of the door.

In an alternative embodiment, the lens element provided in the interspace between the outer and inner panes is embodied as a lens film that is adhesively bonded onto the surface of the inner pane facing the interspace. In a further alternative embodiment, the lens element comprises a lens configuration formed directly on the surface of the inner pane facing the interspace. The lens in each case is preferably embodied as a Fresnel lens.

BRIEF DESCRIPTION OF THE DRAWINGS

In order that the invention may be clearly understood, it will now be described in connection with an example embodiment, with reference to the accompanying drawings, wherein:

FIG. 1 is a schematic front elevation view of a circular window for an aircraft door according to the invention;

FIG. 2 is a cross-sectional view of the window of FIG. 1 along the section line II—II;

FIG. 3 is a cross-sectional view similar to FIG. 2 but showing a second embodiment of a lens element;

FIG. 4 is a cross-sectional view similar to FIG. 2 but showing a third embodiment of a lens element;

FIG. 5 is a schematic elevation view of a first configuration of a view field expanding zone and a direct viewing zone;

FIG. 6 is a schematic elevation view of a second configuration of a view field expanding zone and a direct viewing zone; and FIG. 7 is a schematic elevation view of a third configuration of a view field expanding zone and a direct viewing zone.

DETAILED DESCRIPTION OF PREFERRED EXAMPLE EMBODIMENTS AND OF THE BEST MODE OF THE INVENTION

The window for an aircraft door according to the invention, as shown in FIGS. 1 and 2, has many general features common to conventional aircraft windows known in the art. For example, the general construction of the window is a double pane fail-safe construction including an outer pane 1 and an inner pane 2 arranged spaced apart and extending generally parallel to each other. The outer perimeters of the two panes 1 and 2 are received and sealed between respective shanks or flanges of a window seal 4. Thereby, a hollow interspace 5 is formed between the panes 1 and 2 and is enclosed or sealed by the window seal 4 in an airtight manner around the perimeter thereof.

Moreover, the outer perimeters or edges of the panes 1 and 2 are received in and/or secured to a window frame in any conventionally known manner and arrangement (which is not shown). The window frame, in turn, is fitted into a corresponding opening in the door structure and is mechanically secured to the door structure so as to secure and support the window relative to the door. The structure, arrangement, and securing of the window frame, as well as the mounting of the window panes in the frame, can be according to any conventionally known teachings in the aircraft construction art. The present embodiment shows a window having a circular plan shape, but the present invention could similarly be applied to a window with an oval plan shape, for example.

The special features of the invention become more clear especially in connection with the cross-sectional view of FIG. 2. According to the illustrated embodiment of the invention, an intermediate pane 3 is arranged in the interspace 5 between the outer pane 1 and the inner pane 2, whereby this intermediate pane 3 is arranged or mounted in a similar manner as the outer pane 1 and inner pane 2. In other words, the perimeter edges of the intermediate pane 3 are supported and sealed by a corresponding rim or flange of the window seal 4. Moreover, the intermediate pane 3 is arranged and extends substantially surfacially parallel to the pane surfaces of the outer and inner panes 1 and 2, and extends entirely across the opening area or viewing area of the window in all directions bounded by the seal 4 or the window frame.

To achieve a pressure compensation and venting of moisture to prevent condensation within the interspace 3, a compensating hole 6 is provided through the inner pane 2 at a lower area thereof. A similar compensating hole 6 is further provided through the intermediate pane 3. Preferably, the compensating holes 6 provided respectively in the inner pane 2 and the intermediate pane 3 are axially aligned with each other, so they essentially form one continuing hole. The hole 6 through the intermediate pane 3 ensures pressure compensation of the two chambers or partial spaces of the interspace 3 on opposite sides of the intermediate pane 3, thereby preventing flexing and mechanical loading of the intermediate pane 3 that would otherwise result from a pressure differential on opposites sides thereof. Since the intermediate pane 3 does not carry any mechanical loads, it does not need to be structurally strong, and can therefore be made of a light-weight plastic, for example cast acrylic such as polymethyl methacrylate (PMMA). Such flexing of the intermediate pane 3 would have undesirable effects on the visibility through the pane 3, especially since the pane 3 is embodied as a lens element according to the invention, as will be described in detail next.

In order to provide an improved visibility and enlarged field of view while looking out through the window, according to the invention, the intermediate pane 3 is embodied as an optical lens element over a predominant portion or all of its surface area, for example at least half, or preferably at least three quarters, or most preferably all of its visible surface area. Preferably, the intermediate pane 3 is embodied as a Fresnel lens over the predominant portion of its surface area. In a generally known manner, by refracting the incident light, the Fresnel lens "bends" the incident light rays of the view outside of the aircraft door, and thereby can expand the field of view in any direction based on a proper design of the Fresnel lens.

It is especially important to improve the field of view in the area below the window extending down to the bottom of the door, because safety regulations require that a boarding stairway, jetway, or the like that is docked or secured against the side of the aircraft, must visually inspected before the aircraft door is opened. Such a visual inspection in a downward direction outside of the door is difficult in aircraft, in which the window has an upward tilted orientation due to the negative contour curvature of the fuselage and the aircraft door at the location at which the windows are installed. For this reason, the intermediate pane 3 embodied at least predominantly as a Fresnel lens can be especially designed and configured to provide an expanded or widened field of view toward the bottom and the lower sides, without affecting or distorting the view along a straight line perpendicularly through the window or in the upward direction.

In other words, the Fresnel lens can be especially designed and arranged to provide an expanded field of view, e.g. in the manner of a "fish eye lens", particularly in the area or areas where such an expanded field of view is necessary, without affecting, or affecting to a lesser degree, the other areas of the intermediate pane 3. One preferred pattern of such differential zones includes a field-expanding zone 13 at the bottom of the window, e.g. with a circular segment shape (see FIG. 6) or a crescent shape (see FIG. 7), and a direct viewing zone 12 without an expanded field of view at the top of the window area. Another preferred pattern of such differential zones of optical influence includes a central zone 12 that is not influenced, for direct straight-ahead viewing, and an annular zone 13 around the entire perimeter of the window, which provides an expanded field of view in all peripheral directions (see FIG. 5). Alternatively, an expansion of the field of view can be provided over the entire area of the intermediate pane 3, i.e. the entire area of the window. In this simplest embodiment, the entire circular intermediate pane 3 is embodied as a Fresnel lens over substantially all of its viewable surface area, and provides a uniform spherical expansion of the field of view in all peripheral directions.

As shown in FIG. 2, the intermediate pane 3 is a self-supporting pane element with respective spaces on both opposite sides of the pane 3, i.e. with respective spaces between the intermediate pane 3 and the outer pane 1, and between the intermediate pane 3 and the inner pane 2. In this embodiment, the intermediate pane 3 is arranged relatively closer to the inner pane 2, primarily because the outer pane 1 has a somewhat cupped contour, of which the peripheral rim curves inwardly toward the aircraft interior, and therefore would make it inconvenient to arrange the intermediate pane 3 outwardly closer to the major surface plane of the outer pane 1. In this embodiment of a self-supporting intermediate pane 3, this pane 3 is, for example, a cast acrylic glass element, for example made of polymethyl methacrylate (PMMA).

As an alternative embodiment shown in FIG. 3, the intermediate element 3' embodied as a Fresnel lens element can be manufactured as a flexible optical film 3' with the Fresnel lens configurations (not expressly shown in FIG. 3) etched, pressed, or molded or otherwise formed into this film. Such a film lens element 3' may be directly adhered onto the surface of the inner pane 2 facing the intermediate space 5. In other words, in this alternative arrangement, there is no air space or intermediate space between the film lens element 3' and the inner pane 2.

As a further alternative embodiment shown in FIG. 4, the lens element 3" in the form of a Fresnel lens configuration can be directly provided on the surface of the inner pane 2 facing toward the intermediate space 5. For example, the Fresnel lens configuration 3" (shown exaggerated in FIG. 4) can be etched, milled, cast, molded, or pressed into the surface of the inner pane 2 facing the intermediate space 5.

In all of the above embodiments, the material of the intermediate element 3, 3' or 3" and the quality and resolution of the Fresnel lens configurations is adequate to ensure satisfactory optical performance, i.e. to achieve an expanded field of view with adequately clear, undistorted visibility.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A window arrangement for an aircraft door, comprising:
   an outer pane;
   an inner pane arranged spaced apart from said outer pane with an interspace therebetween;
   a window seal arrangement in which a respective perimeter of said outer pane and of said inner pane is respectively mounted and sealed; and
   an optical lens element provided in said interspace and extending surfacially parallel to said inner pane and said outer pane over at least a majority of a viewing area through said panes bounded by said window seal arrangement.

2. The window arrangement according to claim 1, wherein said lens element comprises an intermediate pane that is self-supportingly arranged and spaced between said outer pane and said inner pane in said interspace.

3. The window arrangement according to claim 2, wherein said intermediate pane is a planar disk element, and a perimeter of said intermediate pane is mounted and held in said window seal arrangement.

4. The window arrangement according to claim 3, wherein said intermediate pane is arranged closer to said inner pane than to said outer pane.

5. The window arrangement according to claim 2, wherein said intermediate pane comprises a Fresnel lens on at least a portion of an exposed surface area of said intermediate pane bounded by said window seal arrangement.

6. The window arrangement according to claim 5, wherein said Fresnel lens extends over all of said exposed surface area of said intermediate pane.

7. The window arrangement according to claim 5, wherein said portion is a majority of said exposed surface area.

8. The window arrangement according to claim 5, wherein said Fresnel lens is configured and arranged to refract light from an area outside of said outer pane and below said window so as to provide an expanded field of view of said area outside of said outer pane and below said window relative to a direct field of view defined by a direct unrefracted line of sight passing outwardly through said viewing area of said inner pane and said outer pane.

9. The window arrangement according to claim 5, wherein said portion is an annular area around a perimeter of said intermediate pane, and wherein a central area of said intermediate pane bounded within said annular area does not comprise said Fresnel lens.

10. The window arrangement according to claim 5, wherein said intermediate pane has a circular plan shape, and said portion is a segment bounded below a horizontal chord line of said circular plan shape of said intermediate pane.

11. The window arrangement according to claim 5, wherein said portion is a crescent-shaped portion at a bottom of said intermediate pane.

12. The window arrangement according to claim 2, wherein said intermediate pane is a cast component of polymethyl methacrylate.

13. The window arrangement according to claim 1, wherein said lens element comprises an optical lens film that is adhesively bonded onto a surface of said inner pane facing said interspace.

14. The window arrangement according to claim 13, wherein said lens film is embodied as a Fresnel lens film.

15. The window arrangement according to claim 1, wherein said lens element comprises a Fresnel lens configuration formed directly on a surface of said inner pane facing said interspace.

16. The window arrangement according to claim 1, further having a pressure compensating vent hole passing through said inner pane and through said lens element.

17. The window arrangement according to claim 1, wherein said optical lens element comprises a Fresnel lens on at least a majority portion of said viewing area.

18. The window arrangement according to claim 17, wherein said Fresnel lens is configured and arranged to refract light from an area outside of said outer pane and below said window so as to provide an expanded field of view of said area outside of said outer pane and below said window relative to a direct field of view defined by a direct unrefracted line of sight passing outwardly through said viewing area of said inner pane and said outer pane.

19. The window arrangement according to claim 17, wherein said portion is an annular area around a center of said viewing area.

20. The window arrangement according to claim 17, wherein said portion is a segment area bounded below a chord line extending horizontally across said viewing area.

21. The window arrangement according to claim 17, wherein said portion is a crescent-shaped area at a bottom of said viewing area.

* * * * *